(12) United States Patent
Raja et al.

(10) Patent No.: US 9,336,041 B2
(45) Date of Patent: *May 10, 2016

(54) FABRIC DISTRIBUTED RESOURCE SCHEDULING

(71) Applicant: VMware, Inc., Palo Alto, CA (US)

(72) Inventors: Krishna Raj Raja, Santa Clara, CA (US); Ajay Gulati, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,251

(22) Filed: Feb. 2, 2015

(65) Prior Publication Data

US 2015/0242235 A1 Aug. 27, 2015

Related U.S. Application Data

(62) Division of application No. 13/479,118, filed on May 23, 2012, now Pat. No. 8,954,575.

(51) Int. Cl.

| | |
|---|---|
| *G06F 15/173* | (2006.01) |
| *G06F 9/455* | (2006.01) |
| *H04L 29/08* | (2006.01) |
| *G06F 3/06* | (2006.01) |
| *H04L 12/729* | (2013.01) |
| *H04L 12/24* | (2006.01) |

(52) U.S. Cl.
CPC ............ *G06F 9/45558* (2013.01); *G06F 3/067* (2013.01); *G06F 3/0613* (2013.01); *G06F 3/0635* (2013.01); *H04L 41/12* (2013.01); *H04L 45/125* (2013.01); *H04L 67/1097* (2013.01); *G06F 2009/45579* (2013.01); *G06F 2009/45583* (2013.01); *G06F 2009/45591* (2013.01)

(58) Field of Classification Search
CPC ................. G06F 9/45558; G06F 2009/45579; G06F 2009/45583; G06F 2009/45591; H04L 67/1097; H04L 41/12; H04M 5/08
See application file for complete search history.

(56) References Cited

U.S. PATENT DOCUMENTS

| | | | | |
|---|---|---|---|---|
| 7,930,583 | B1* | 4/2011 | Vemuri | G06F 11/0727 709/223 |
| 8,560,671 | B1* | 10/2013 | Yahalom | H04L 67/1097 709/224 |
| 2004/0228323 | A1* | 11/2004 | Acharya | H04L 45/00 370/351 |
| 2008/0250178 | A1* | 10/2008 | Haustein | H04L 47/10 710/107 |
| 2009/0172666 | A1* | 7/2009 | Yahalom | G06F 3/0605 718/1 |

(Continued)

OTHER PUBLICATIONS

Gulati, et al., "PARDA: Proportional Allocation of Resources for Distributed Storage Access", 7th USENIX Conference on File and Storage Technologies, 2009, 14 pages.

(Continued)

*Primary Examiner* — Ario Etienne
*Assistant Examiner* — Kidest Mendaye

(57) ABSTRACT

Embodiments perform centralized input/output (I/O) path selection for hosts accessing storage devices in distributed resource sharing environments. The path selection accommodates loads along the paths through the fabric and at the storage devices. Topology changes may also be identified and automatically initiated. Some embodiments contemplate the hosts executing a plurality of virtual machines (VMs) accessing logical unit numbers (LUNs) in a storage area network (SAN).

20 Claims, 7 Drawing Sheets

(56) References Cited

U.S. PATENT DOCUMENTS

| | | |
|---|---|---|
| 2010/0083262 A1 | 4/2010 | Gulati et al. |
| 2011/0029973 A1 | 2/2011 | Hara et al. |
| 2011/0072208 A1 | 3/2011 | Gulati et al. |
| 2011/0119413 A1 | 5/2011 | Gulati et al. |
| 2011/0138391 A1* | 6/2011 | Cho .................... G06F 9/4881 718/102 |
| 2012/0005371 A1* | 1/2012 | Ravindran .............. H04L 45/50 709/242 |
| 2012/0054329 A1 | 3/2012 | Gulati et al. |
| 2013/0110966 A1* | 5/2013 | Nagami ................ H04L 47/125 709/214 |

OTHER PUBLICATIONS

Unknown, "VMware VROOM! Blog: 350,000 I/O operations per Second, One vSphere Host", Retrieved from <<https://web.archive.org/web/20090526215013/http://blogs.vmware.com/performance/2009/05/350000-io-operations-per-second-one-vsphere-host-with-30-efds.html>>, May 18, 2009, 3 pages.

Unknown, "Veritas Storage Foundation 5.0 Dynamic Multi-Pathing", Retrieved from <<http://eval.symantec.com/mktginfo/enterprise/white_papers/ent-whitepaper_vsf_5.0_dynamic_multi-pathing_05-2007.en-us.pdf>>, May 2007, 41 pages.

Australian Application No. 2015202178, Examination Report dated Jan. 8, 2016, 5 pages.

* cited by examiner

ND RESOURCE SCHEDULING

FABRIC DISTRIBUTED RESOURCE SCHEDULING

CROSS-REFERENCE TO RELATED APPLICATION

This application is a divisional of U.S. application Ser. No. 13/479,118, filed May 23, 2012, and entitled "Fabric Distributed Resource Scheduling", (Issued as U.S. Pat. No. 8,954,575 on Feb. 10, 2015) the entirety of which is hereby incorporated by reference herein.

BACKGROUND

In shared storage systems such as virtual datacenters executing many virtual machines (VMs), multiple hosts may share the same set of storage devices and/or the same set of storage input/output (I/O) paths. Avoiding fabric congestion with some existing systems is difficult at least because of the complexity and changes in fabric topology, I/O load, and I/O path selection. For example, VMs, virtual disks, hosts, storage devices (or other storage areas), and Fibre channel links may be added and removed dynamically.

Further, advanced disk technology such as in solid-state disks (SSDs) provides better random I/O performance over other types of disks. SSDs are being used as cached, front-end tiers, and/or complete spindle replacements. With SSDs, it may be possible to achieve as high as 3 Gbytes/sec of random disk I/O traffic leading to an increase in I/O bandwidth per storage device or logical unit number (LUN). Additionally, high throughput sequential I/O operations such as backups, cloning, and template deployment may saturate fabric links and/or cause failure.

Responding to dynamic events by manually determining optimum paths for the individual hosts is difficult, unreliable, error prone, and unlikely to provide effective load balancing. Further, some of the existing systems attempt to load balance by multi-pathing, throttling I/O, performing LUN path selection techniques, migrating workloads from one host to another, or migrating data from one LUN or datastore to another. Such existing systems, however, fail to distinguish between LUN congestion and link congestion. As such, these existing systems cannot suggest alternate paths for accessing a LUN when the current path is congested. Additionally, many of the existing system operate at the host level and thus cannot produce a global optimum or alter or recommend topology changes or alternate paths to remedy bottlenecks.

SUMMARY

One or more embodiments described herein enable centralized and globally optimized input/output (I/O) load-based path management in a shared storage area network (SAN). A plurality of storage paths each from one of a plurality of hosts to at least one logical storage device visible therefrom is identified. Based at least on I/O loads on the storage paths and an iterative search technique, a minimum bandwidth is determined for each link or storage path. For each pair of host and logical storage device, one of the storage paths is selected based on the minimum bandwidth.

To reduce the probability of congestion along the storage paths and/or at the logical storage devices, embodiments described herein monitor SAN topology and I/O loads to identify and initiate topology changes. In some embodiments, the topology changes include migrating loads and/or datastores associated with a plurality of virtual machines (VMs) executing on the hosts.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
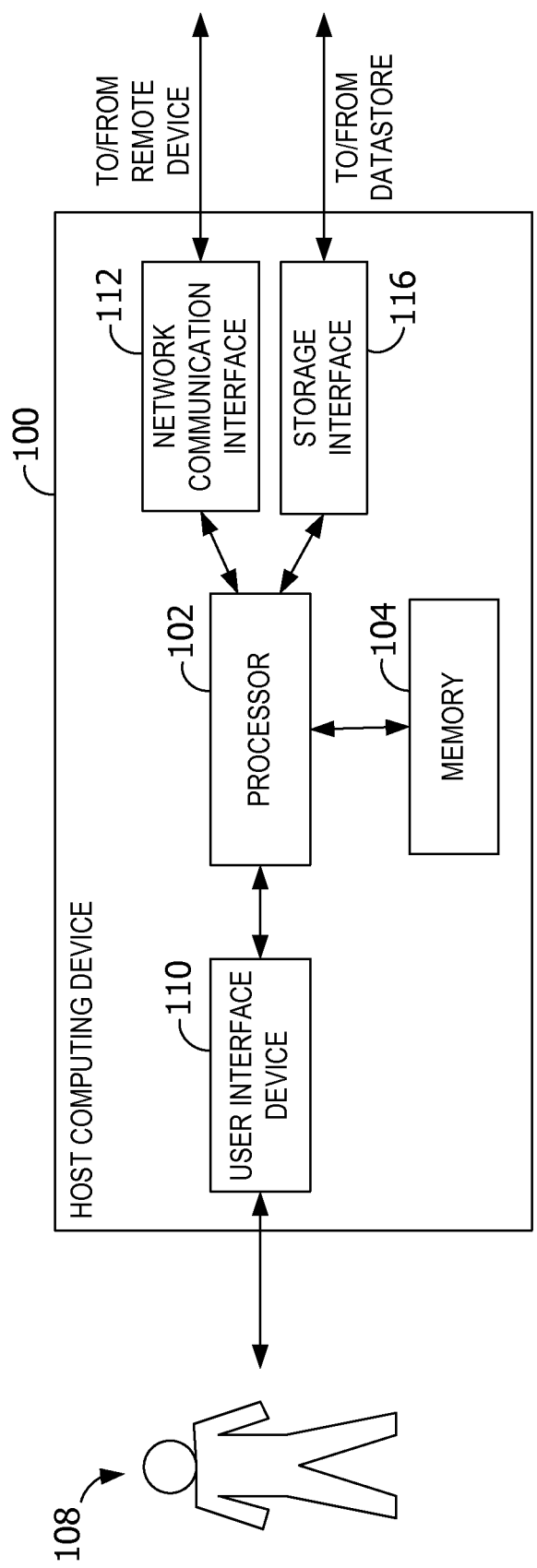
FIG. 1 is a block diagram of an exemplary host computing device.

Embodiments described herein implement centralized input/output (I/O) path selection and management across a plurality of hosts (e.g., in a cluster) in storage area networks (SANs), such as SAN 512, having shared storage arrays. Path recommendations are based on the I/O load conditions in the fabric (e.g., links) and selected using, for example, conditional iterative search on top of a network flow algorithm (e.g., a max-flow algorithm). As a result, aspects of the disclosure select an I/O path for each host-LUN pair such that no single point on the path from host 514 to array 302 is overloaded thus resulting in a global optimum.

In some embodiments, an initial path selection recommendation is determined by performing the operations described herein assuming uniform I/O load per storage device per host 514 to balance the number of paths across host bus adapters (HBAs) and ports 304 in the storage array such as disk array 302. The path selection recommendations are reconfigured as the I/O bandwidth consumption (e.g., load or demand) per storage device per host 514 is monitored over time. The path selection recommendations may also be reconfigured when the SAN 512 topology changes. In some embodiments, perlink bandwidth constraints (when known) are enforced.

Aspects of the disclosure reduce the probability of I/O congestion in the fabric and adapt to or otherwise accommodate topology changes and dynamic I/O conditions. Centralized management computes an I/O path for each individual LUN visible on each host 514 for a given topology in a load balanced manner, initiates topology changes or other remediation, and handles events leading to the topology changes and other symptoms of link congestion. For example, centralized path selection not only identifies congestion scenarios such as an imbalance of LUNs or LUN loads across storage processors 306 or other storage controllers, but also suggests remediation such as changing paths for particular hosts 514, initiating LUN trespass (e.g., changing LUN to controller mapping), and/or migrating I/O loads.

Some embodiments are implemented in virtual datacenters executing many virtual machines (VMs) having shared storage arrays. In shared storage arrays, multiple LUNs may be accessed via the same storage path by multiple different hosts 514. As such, the aggregate throughput may exceed the available link bandwidth on a single path producing a bottleneck. As an example, if a LUN is capable of 250 MB/sec via a Fibre channel link speed of 8 Gb/sec, a theoretical maximum bandwidth of 1000 MB/sec may be saturated by simultaneous sequential I/O on four LUNs. Such simultaneous, sequential, I/O operations may occur, for example, during backup, cloning, and template deployment. Aspects of the disclosure enable path selection to reduce such congestion on the links and at the LUNs.

Further, centralized path selection enables every link on a multi-hop path from host 514 to array to operate at its maximum link capacity to enable maximum end-to-end bandwidth, even when storage array ports 304 and/or some of the links in the fabric operate at a lower link speed than that of the HBAs on host 514. For example, an HBA may operate at 8 Gbits/sec while storage array ports 304 may operate at 4 Gbits/sec.

Additionally, aspects of the disclosure are operable in environments in which multiple paths may converge to a single storage port 304 and/or there is imbalanced LUN-to-controller mapping (e.g., an "in-cast" problem). For example, there may be multiple hosts 514 connecting to a smaller quantity of storage ports 304 on the disk array 302. Aspects of the disclosure improve the performance of such systems.

An exemplary operating environment including a host computing device 100 executing one or more VMs is next described. Aspects of the disclosure, however, are not limited to such an environment and instead are applicable in non-VM environments.

FIG. 1 is a block diagram of exemplary host computing device 100. Host computing device 100 includes a processor 102 for executing instructions, and may be referred to as one of hosts 514. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more of datastores 316, which store virtual disk images, software applications, and/or any other data suitable for use with the methods described herein. In exemplary embodiments, storage interface 116 couples host computing device 100 to a SAN (e.g., a Fibre Channel network) such as SAN 512 and/or to a network-attached storage (NAS) system (e.g., via a packet network). The storage interface 116 may be integrated with network communication interface 112.

Figure 2:
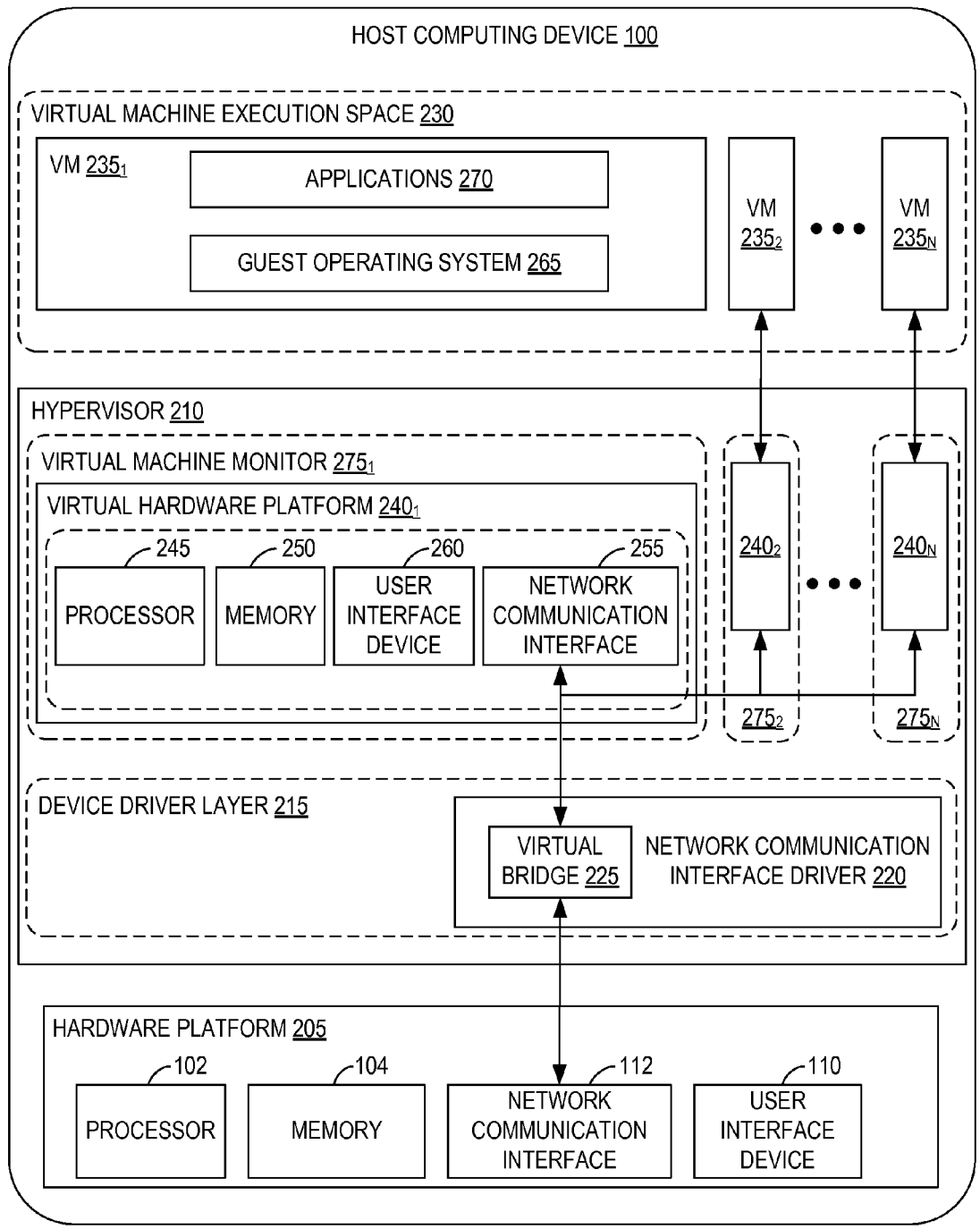
FIG. 2 is a block diagram of virtual machines that are instantiated on a computing device, such as the host computing device shown in FIG. 1.

FIG. 2 depicts a block diagram of virtual machines $235_1$, $235_2 \ldots 235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to as hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform 240₁ includes a virtual disk that is associated with or "mapped to" one or more virtual disk images stored in memory 104 (e.g., a hard disk or solid state disk) of host computing device 100. The virtual disk image represents a file system (e.g., a hierarchy of directories and files) used by first VM 235₁ in a single file or in a plurality of files, each of which includes a portion of the file system. In addition, or alternatively, virtual disk images may be stored in memory 104 of one or more remote computing devices 100, such as in a SAN configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs 235₁-235$_N$). Each virtual communication interface for each VM 235₁-235$_N$, such as network communication interface 255 for first VM 235₁, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs 235₁-235$_N$. This configuration enables an Ethernet packet that has a virtual MAC address as its destination address to properly reach the VM in host computing device 100 with a virtual communication interface that corresponds to such virtual MAC address.

Virtual hardware platform 240₁ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM 235₁. Virtual hardware platforms 240₁-240$_N$ may be considered to be part of virtual machine monitors (VMM) 275₁-275$_N$ that implement virtual system support to coordinate operations between hypervisor 210 and corresponding VMs 235₁-235$_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms 240₁-240$_N$ may also be considered to be separate from VMMs 275₁-275$_N$, and VMMs 275₁-275$_N$ may be considered to be separate from hypervisor 210. One example of hypervisor 210 that may be used in an embodiment of the disclosure is included as a component in VMware's ESX brand software, which is commercially available from VMware, Inc.

Figure 3:
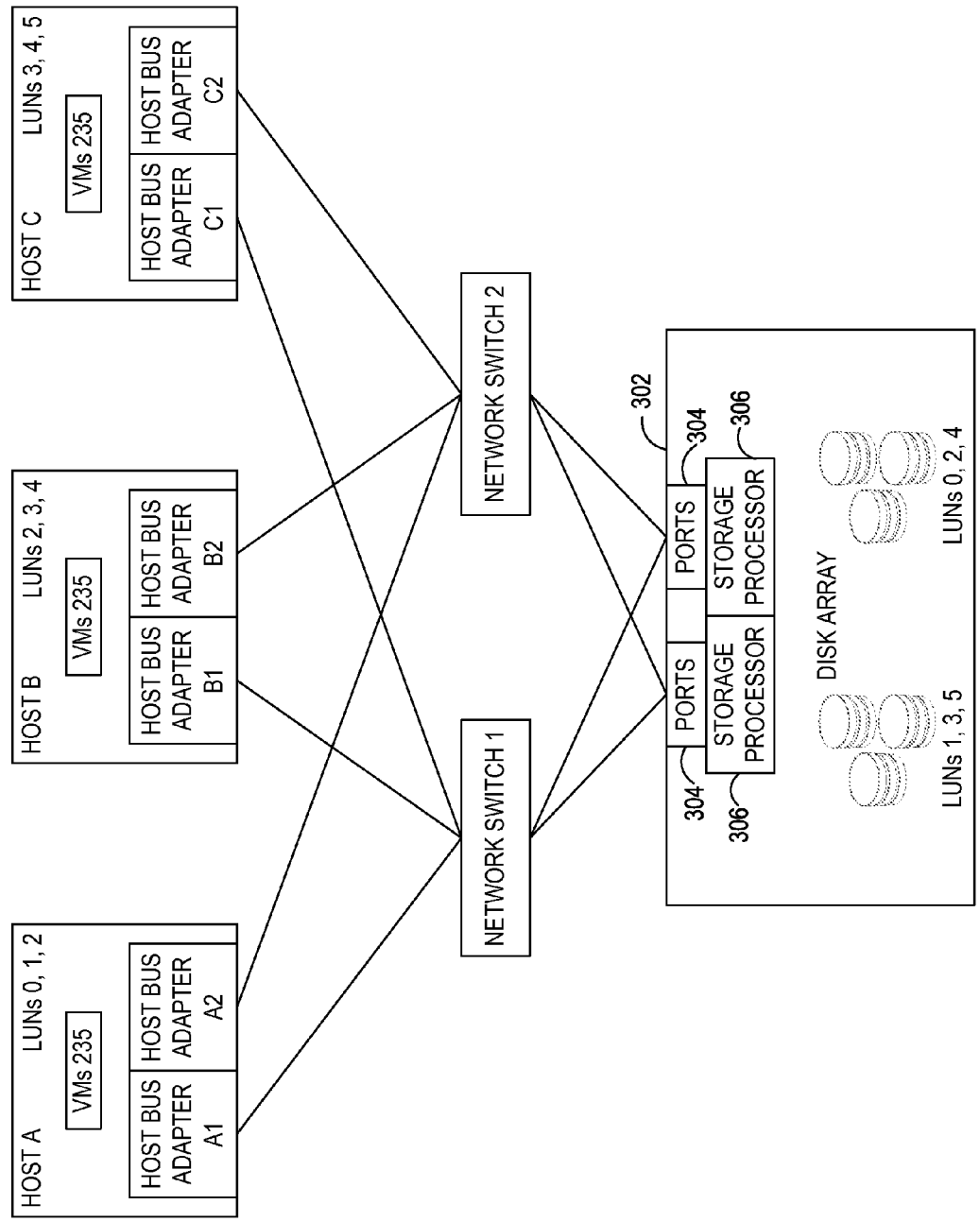
FIG. 3 is a block diagram of an exemplary storage area network (SAN) architecture including hosts accessing a disk array via storage paths through network switches.

FIG. 3 is a block diagram of an exemplary SAN architecture including hosts 514 accessing disk array 302 via storage paths through network switches 516. In general, an I/O path may include an HBA, cables, SAN switch (e.g., switch 516), storage port 304, and a disk controller or storage processor 306 at disk array 302. In other embodiments, the I/O path or other storage path may be defined by identifying one of hosts 514, one HBA, one array port 304, and a LUN. There may also be more than one port 304 per storage processor 306. Storage processors 306 virtualize the disks in the array by constructing one or more LUNs and presenting the LUNs to hosts 514 as a single storage device. Each unique combination of host 514, switches 516, port 304, controller, and LUN represents a different I/O path.

In the example of FIG. 3, three hosts 514 including Host A, Host B, and Host C connect to disk array 302 via network switches 516 including Network Switch 1 and Network Switch 2. In some embodiments, network switches 516 are compatible with the Fibre Channel (FC) protocol. Exemplary network switches 516 may each provide a 4 Gb/sec link.

Each of Hosts A, B, and C executes one or more VMs. Each of these hosts includes at least one HBA. Host 1 includes Host Bus Adapter A1 and Host Bus Adapter A2. Host B includes Host Bus Adapter B1 and Host Bus Adapter B2. Host C includes Host Bus Adapter C1 and Host Bus Adapter C2. Exemplary HBAs may each provide an 8 Gb/sec link.

Disk array 302 includes one or more ports 304, one or more storage processors 306, and one or more LUNs. In the example of FIG. 3, disk array 302 includes two ports 304 each having one storage processor 306 managing three LUNs. One storage processor 306 manages LUNs 1, 3, and 5 while the other storage processor 306 manages LUNs 0, 2, and 4. Exemplary LUNs may each provide a 250 MB/s link.

Aspects of the disclosure are operable with any I/O path description. As an example, an I/O path between a host $H_1$ and a LUN $L_1$ may be defined as shown below in Equation (1):

$$\{H_1, HBA_i, Sport_{k_1}, \ldots, Sport_{k_n}, Aport_j, LUN_1\} \quad (1)$$

In this example, $HBA_i$ denotes one of the HBAs at host 514, $Sport_{k_n}$ denotes a port at one of network switches 516, and $Aport_j$ denotes port 304 and storage processor 306 combination at disk array 302. If, however, structural details about network switches 516 are unknown (e.g., switch ports may not be visible to the multi-pathing layer), the I/O path may be instead described in terms of endpoints such as shown in Equation (2) below:

$$\{H_1, HBA_i, Aport_j, LUN_1\} \quad (2)$$

Having multiple paths from each host 514 to LUN enhances overall availability of disk array 302. Multiple I/O paths protect against any single failure from host 514 to disk array 302 including HBAs, SAN switch (e.g., switch 516), or a cable connecting various elements. For example, LUN performance may be limited by high I/O path bandwidth after sequential I/O requests or cache hits for a workload cause transient saturation. In response, or if any element in the I/O path fails, host 514 may choose to switch or divert to another available path without exposing the degraded performance or element failure to the application accessing host 514.

Multi-pathing may be implemented in various ways. For example, an active-active disk array executes I/O requests to a single LUN on any port 304 concurrently. As another example, an active-passive disk array executes I/O requests to a single LUN on one or more ports 304 of one storage processor 306 (an active or primary controller) but is also able to fail-over the request to the LUN on ports 304 of another storage processor 306 (a passive or secondary controller). Performing such a fail-over may be referred to as LUN trespass. Such disk arrays trigger fail-over for a LUN based on the port 304 where the I/O requests are received to ensure that the I/O requests are flowing through one of storage processors 306 at any given time.

Still another example of disk array implementation is pseudo active-active. In such disk arrays, a LUN may be accessed through multiple storage processors 306 but with non-uniform performance (e.g., varying degrees or levels of performance). The paths through multiple storage processors 306 may be discovered (e.g., by an operating system) during an initial device discovery phase. The discovered paths may appear as different devices, but a path management layer may identify common device endpoints among the paths enabling path selection in a dynamic manner.

The path management layer implements policies to manage path selection and to handle errors. Exemplary policies include round-robin, minimum queue length, balanced path, adaptive path selection, and single active path. A round-robin policy evenly distributes I/O requests on each active path, especially when data requested by the I/O requests are approximately the same size and the paths are evenly distributed across HBAs, ports 304, and controllers.

A minimum queue length policy implements local load balancing by routing each I/O request to the active path having the smallest quantity of outstanding requests at the HBA of requesting host 514. A balanced path policy divides the block address space of a device into regions each to the quantity of active paths to enable assignment of each I/O request to the path corresponding to the starting block address. An adaptive path selection policy computes periodic path priority based on service time and recent throughout to assign higher priorities to paths that recently delivered higher throughput or better performance. Such policies assign weights to various paths (instead of strict priorities) and send I/O requests proportional to the assigned weights. Such policies are operable with highly dynamic workloads or with paths with very different performance or hop-counts. A single active path policy uses one path until failure of that path and then switches to a fail-over path.

While aspects of the disclosure are operable in conjunction with existing multi-pathing techniques such as described herein, centralized management of path selection further detects and accommodates congestion in the I/O paths. In some embodiments, the centralized path selection is implemented by mapping path selection to a network max flow analysis. While next described with reference to an exemplary network max flow analysis, aspects of the disclosure are operable with any max flow analysis modified as described herein.

The network max flow analysis operates on a graph $G=(V, E)$ where V is the set of vertex and E is the set of edges and a capacity $c(u,v)$ for each edge $(u,v)$. An exemplary network max flow problem may be described as finding the maximum flow from a source s and a destination t by computing a flow $f(u,v)$ per edge $(u,v)$ such that:

1. $f(u,v)<=c(u,v)$ for all edges
2. The sum of flow entering a node is equal to the sum of flows leaving the node, except s and t nodes.
3. The total flow from source s to destination t is the maximum possible.

Aspects of the disclosure are operable with the various existing systems solving the max flow problem or performing max flow analysis, such as the Ford-Fulkerson algorithm and the Edmond-Karp algorithm. In some embodiments, modifying a multi-source, multi-destination max flow problem to enable mapping centralized path selection thereon includes creating a source node $H_iL_j$ for each host $H_i$ and LUN $L_j$, creating a destination node $L_j$ for each LUN $L_j$, adding a single source in front of all $H_iL_j$ nodes and a single sink to all $L_j$ nodes with infinite capacity on the edges, and creating intermediate nodes corresponding to the HBAs at each host 514 and array ports 304 connected to each LUN. An example of such mapping is shown next in FIG. 4.

Figure 4:
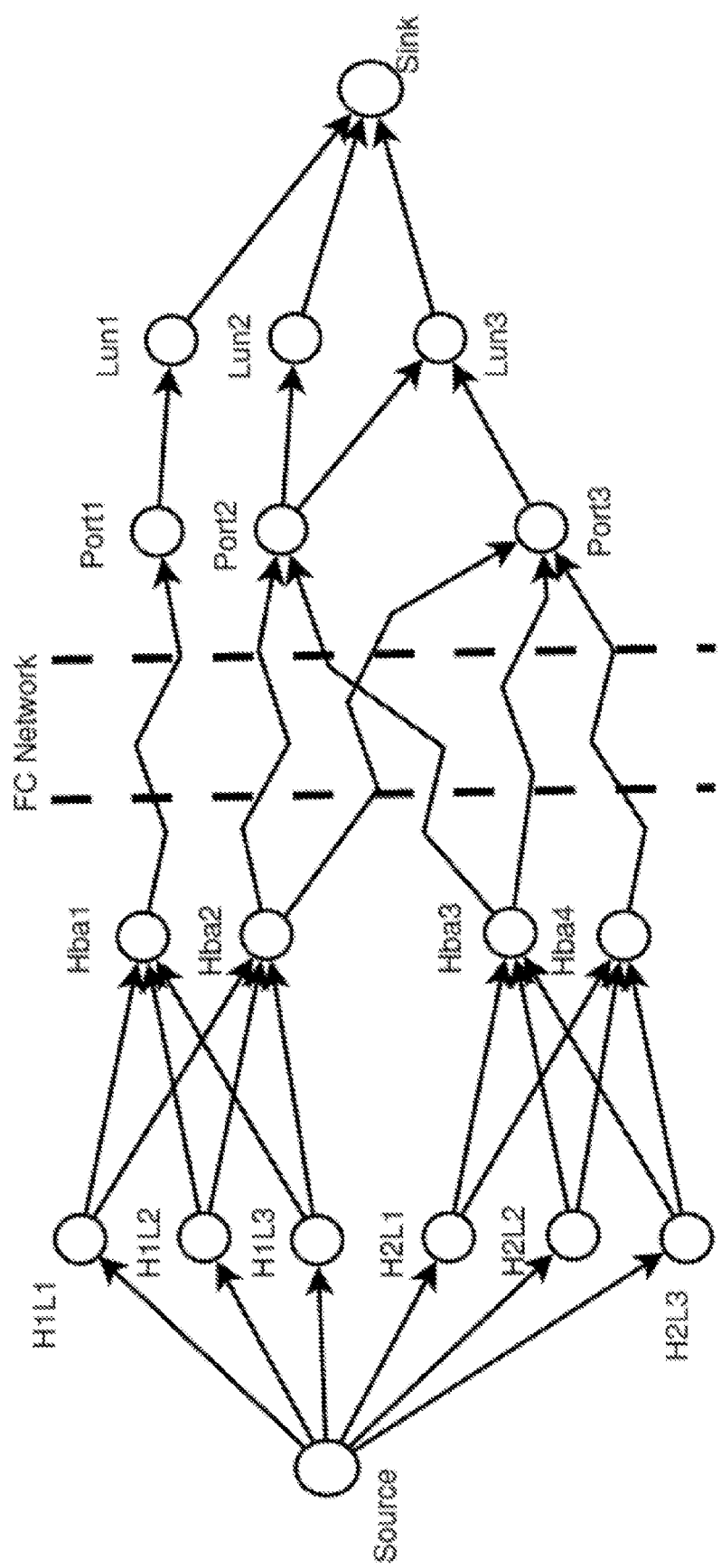
FIG. 4 is a block diagram of an exemplary mapping of optimum storage path selection to a network flow analysis.

FIG. 4 is a block diagram of an exemplary mapping of optimum storage path selection to a network flow analysis. In this example, there are two hosts 514 (H1 and H2) with two HBAs each (HBA1, HBA2, HBA3, and HBA4) connected to three LUNs (LUN1, LUN2, and LUN3).

Initial path selection is performed by balancing the paths through each HBA and storage processor ports 304 assuming that the I/O load across all LUNs is uniform. In operation, a capacity of 1 is assigned to all edges (e.g., links) except edges to the source (e.g., source node) and to the sink (destination node). The max flow algorithm is performed to find if every $H_iL_j$ node has a non-zero path to the $L_j$ node. For each path found, a capacity equal to 1 is consumed by all edges in the path. If all nodes do not have a path, the edge weights are increased by 1 and the max flow algorithm is re-performed (e.g., iteratively) until all nodes have such a path. After all nodes have a path, the initial paths for all LUNs from all hosts 514 resulting from iterative performance of the max flow algorithm in this manner uses minimum stress on each HBA and controller port 304.

Load-based I/O path selection is next performed to enable path assignment based not just on the number or quantity of available paths, but also using the actual I/O bandwidth consumed by each host 514 for each LUN. A particular amount of capacity C is defined in terms of I/O bandwidth on edges from $H_iL_j$ notes to HBA nodes and from port nodes to LUNs. For example, two capacity values per edge, $C_{min}$ and $C_{max}$, are initialized as the average I/O bandwidth per host 514 per HBA and the highest possible network switch link capacity, respectively. Aspects of the disclosure, however, contemplate other initial capacity values.

The max-flow algorithm is performed to find if every $H_iL_j$ node has a non-zero path to the $L_j$ node. Every time a path is found, the demand from host $H_i$ to $L_j$ is subtracted from the capacities in the path. A binary search is performed to find minimum I/O bandwidth, or capacity, that satisfies all paths. The paths corresponding to this minimum I/O bandwidth represent the selected paths, or the paths recommended to hosts 514.

In some embodiments, a particular path may end up oversubscribed. If an HBA, port 304, or intermediate link bandwidth or other capacity is known, this link constraint may be used as the upper bound for link capacity in the path selection algorithm to ensure that no link is supporting a demand more than its capacity. Maximum link capacity values may be found by discovering link bandwidth (e.g., using a large I/O request to a cached location during an idle period) and/or querying network switches 516 to expose the information. If no path from a particular host 514 to LUN may be found without exceeding the link capacity, a topology change may be suggested and/or a link saturation alert may be sent to an administrator 502. As described further below with reference to FIG. 7, topology changes may be initiated. For example, trespassing LUNs, moving data out of a particular LUN, and re-configuring LUN-to-port mappings may be evaluated by iteratively executing the max flow algorithm modified as described herein.

Figure 5:
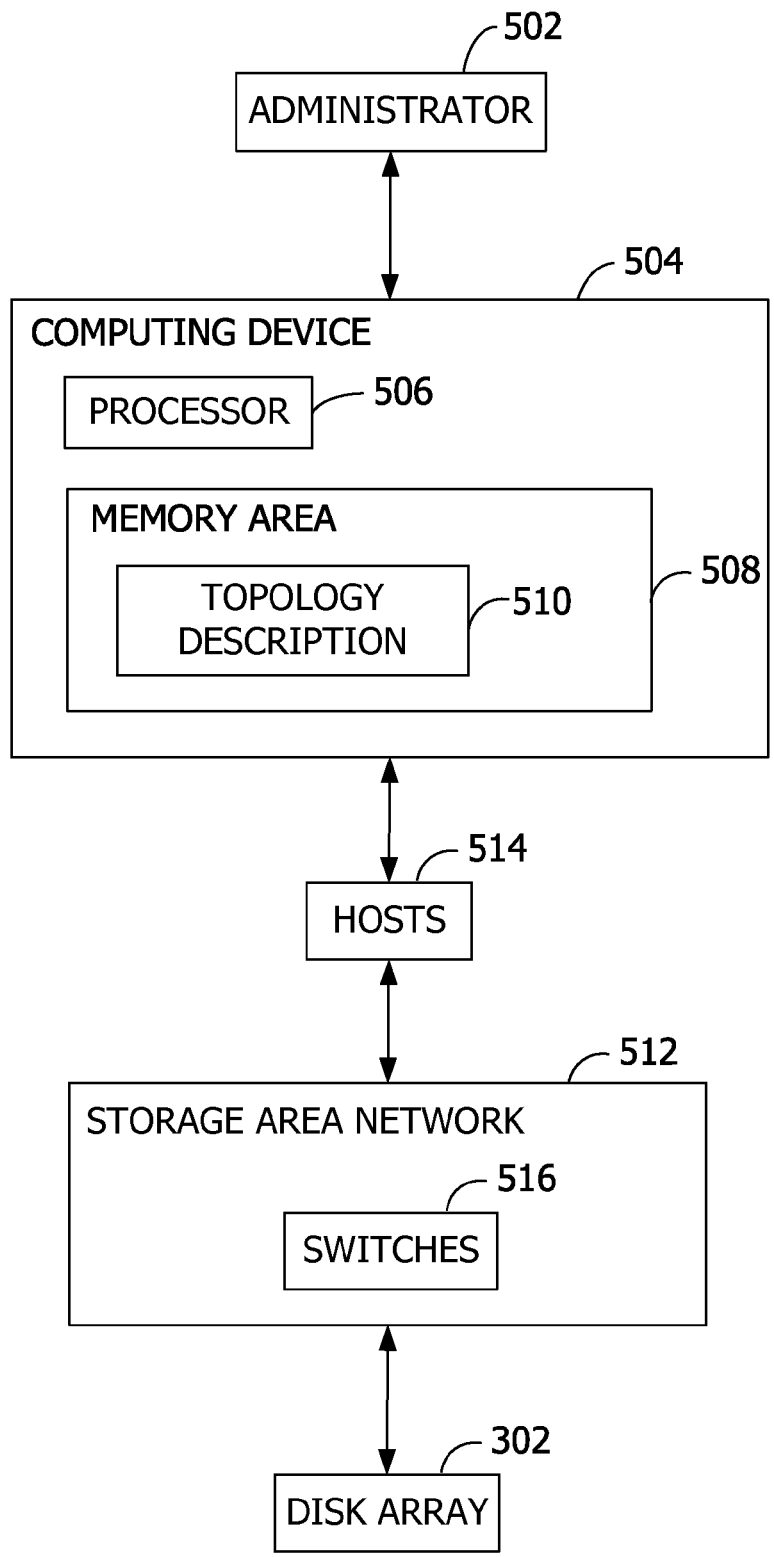
FIG. 5 is a block diagram of an exemplary computing device for implementing centralized input/output (I/O) storage path selection and management.

FIG. 5 is a block diagram of an exemplary computing device 504 for implementing centralized input/output (I/O) storage path selection and management, such as for a plurality of VMs in a SAN. Computing device 504 represents any device executing instructions (e.g., as application programs, operating system functionality, or both) to implement the operations and functionality associated with computing device 504. For example, computing device 504 executes instructions to manage distributed resource scheduling, as described herein. Computing device 504 may include any computing device or processing unit. For example, computing device 504 may represent a group of processing units or other computing devices, such as in a cloud computing configuration. In some embodiments, administrator 502, or other user such as user 108, interacts with computing device 504 to manage aspects of the operation of computing device 504.

Computing device 504 has at least one processor 506 and a memory area 508. Processor 506 includes any quantity of processing units, and is programmed to execute computer-executable instructions for implementing aspects of the disclosure. The instructions may be performed by processor 506 or by multiple processors executing within computing device 504, or performed by a processor external to computing device 504. In some embodiments, processor 506 is programmed to execute instructions such as those illustrated in the figures in a distributed shared storage system.

Memory area 508 includes any quantity of computer-readable media associated with or accessible by computing device 504. Memory area 508, or portions thereof, may be internal to computing device 504, external to computing device 504, or both.

In the example of FIG. 5, memory area 508 stores a topology description 510 of SAN 512. Topology description 510 identifies hosts 514, elements of SAN 512 such as switches 516, and disk arrays 302, as well as configuration thereof (e.g., HBAs, ports 304, storage processors 306, etc.) and links therebetween. In some embodiments, topology description 510 further includes a threshold capacity for SAN 512. The threshold capacity represents, for example, I/O bandwidth per host 514 per HBA, although other threshold capacities are within the scope of the disclosure. The memory area 508 may also store link capacities associated with the links.

In some embodiments, computing device 504 accesses elements of SAN 512 via a network (not shown). The network represents any means for communication between computing device 504 and the elements of SAN 512. Aspects of the disclosure are operable with any network type or configuration.

Figure 6:
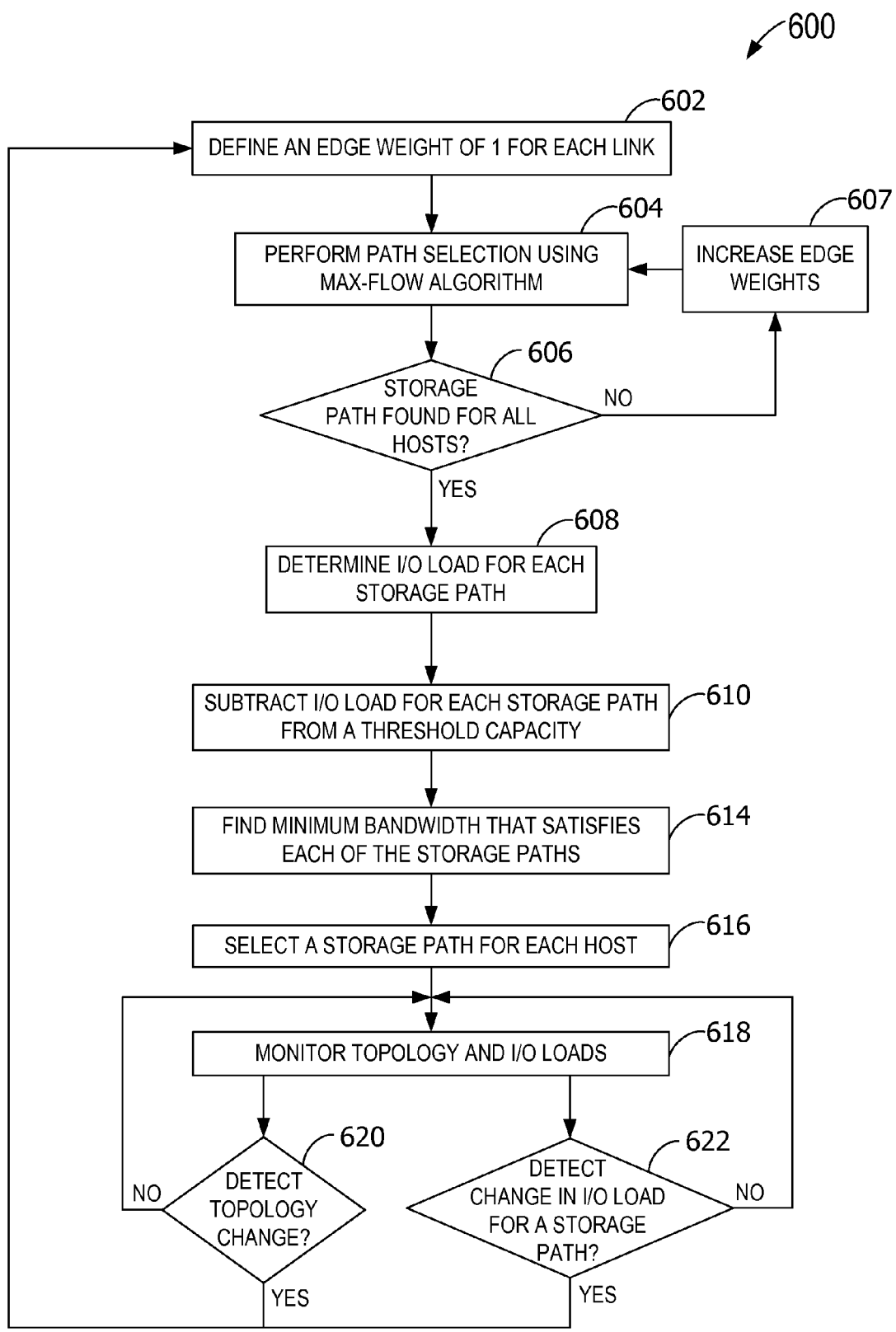
FIG. 6 is a flowchart of an exemplary method performed by a centralized system managing a plurality of hosts to select optimum storage paths in a SAN.

FIG. 6 is a flowchart of an exemplary method performed by a centralized system managing a plurality of hosts 514 to select optimum storage paths in a SAN, such as SAN 512. While method 600 is described with reference to execution by computing device 504 (shown in FIG. 5), it is contemplated that method 600 may be performed by any computing device. Further, execution of the operations illustrated in FIG. 6 is not limited to a VM environment, but is applicable to any multi-source, multi-destination environment. Also, one or more computer-readable storage media storing computer-executable instructions may execute to cause processor 506 to implement centralized I/O load-based path selection by performing the operations illustrated in FIG. 6.

At 604, initial path selection is performed (see FIG. 4) for hosts 514 to identify a plurality of storage paths each from one of a plurality of hosts 514 to at least one logical storage device visible therefrom. While initial path selection is performed for a new topology or upon changes in I/O loads, some embodiments access a set of selected paths rather than selecting the paths.

In general, initial path selection includes iteratively searching for the storage paths by iteratively performing a max flow algorithm with edge weights increasing with each iteration. Any quantity of host-LUN pairs, or none, may be discovered with each iteration, and the edge weights are increased until all host-LUN pairs are found. For example, initial path selection starts by defining edge weights of 1 for each link at 602.

If a storage path is not found at 606 for each host 514, the edge weights are increased at 607 and path selection is performed at 604. Path selection repeats in this manner until a path is found from each host 514 to each connected LUN (e.g., storage devices) to complete the initial path selection.

In some embodiments, upper bound link capacities for one or more links may optionally be defined to, for example, prevent oversubscribing a link. In some embodiments, network elements may be queried to expose the link capacities, or the link capacities may be discoverable through test I/O requests. For example, switches 516 within the storage path may be queried to obtain a maximum capacity of switches 516 for use in selecting the storage paths.

For each storage path found, the I/O load for the storage path is determined at 608. The determined I/O load for each found storage path is subtracted from a threshold capacity at 610. The minimum bandwidth satisfying each of the storage paths, or that is otherwise required to find at least one path from each host 514 to each connected LUN, is found at 614 by, for example, performing a binary search and executing the max-flow algorithm for each value from the binary search.

One of the storage paths is selected for each of hosts 514 based on the minimum bandwidth at 616. The selected storage path for each host 514 is presented, identified, recommended, or otherwise indicated at least to the corresponding host 514.

The path selection operations illustrated in FIG. 6 are repeated in response to changes in SAN 512 topology or I/O loads along the paths. For example, the topology and I/O loads may be monitored at 618. If a topology change at 620 or a change in I/O along a selected storage path at 622 is detected, initial path selection may be re-performed in response to the detection. For example, on detecting a change in the monitored I/O load for one of the storage paths, the updated I/O load is determined, the minimum bandwidth satisfying each of the storage paths is re-calculated, and one of the storage paths is selected for each host 514 based on the re-calculated minimum bandwidth.

As described next with reference to FIG. 7, topology changes may be recommended and, in some embodiments, automatically initiated.

Figure 7:
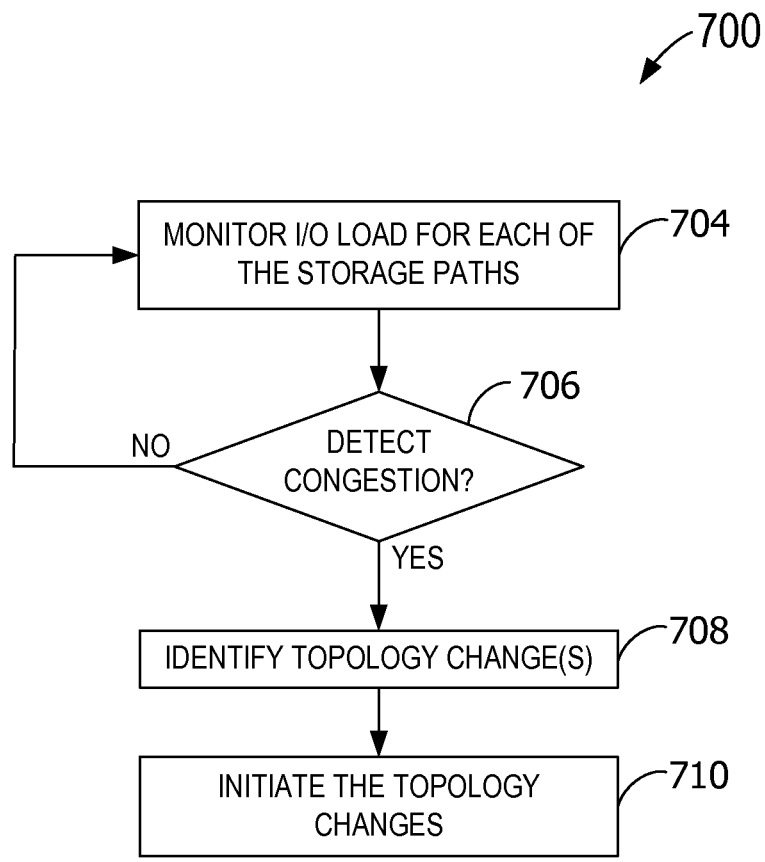
FIG. 7 is a flowchart of an exemplary method performed by the centralized system managing a plurality of hosts to initiate topology changes in response to link or logical unit number (LUN) congestion.

FIG. 7 is a flowchart of an exemplary method performed by the centralized system managing a plurality of hosts 514 to initiate topology changes in response to link or logical unit number (LUN) congestion. While method 700 is described with reference to execution by computing device 504 (shown in FIG. 5), it is contemplated that method 700 may be performed by any computing device. Further, execution of the operations illustrated in FIG. 7 is not limited to a VM environment, but is applicable to any multi-source, multi-destination environment in which topology changes may be initiated. Also, one or more computer-readable storage media storing computer-executable instructions may execute to cause processor 506 to implement centralized I/O load-based path selection by performing the operations illustrated in FIG. 7.

A plurality of storage paths each from one of hosts 514 (e.g., executing VMs) to one of the LUNs or other logical storage devices visible therefrom are identified or accessed. At 704, the I/O load for each of the storage paths is monitored. On determining that the monitored I/O load represents congestion on at least one of the storage paths at 706, one or more topology changes are identified at 708. Example topology changes include, but are not limited to, migrating data from one logical storage device to another logical storage device, migrating a datastore from a first host in the plurality of hosts 514 to a second host in the plurality of hosts 514, and re-mapping logical storage devices to controllers.

In embodiments in which computing device 504 is able to re-configure endpoints within SAN 512, the identified one or more topology changes may be initiated automatically and/or without administrator 502 input at 710. For example, a command may be sent to one of storage processors 306 managing the storage device to re-map the storage device to another storage processor 306 or controller. In some embodiments, initiating the topology changes may further include re-configuring the storage paths and instructing at least one of hosts 514 to use another storage path.

ADDITIONAL EXAMPLES

While aspects of the disclosure have been described herein with reference to LUNs being accessed in an active-passive mode with one path per LUN, other embodiments contemplate environments in which LUNs are accessed in active-active mode with multiple paths per LUN. In such embodiments, the max flow algorithm is modified to find k paths for a LUN for which k paths are allowed. Whenever a path is found, the demand is incremented by k instead of 1.

Exemplary Operating Environment

The operations described herein may be performed by a computer or computing device such as computing device 504. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for identifying topology changes to remediate congestion in the storage paths, and exemplary means for automatically initiating topology changes to remediate congestion in the storage paths. For example, processor 506 programmed to execute the operations as described herein constitutes these exemplary means.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for centralized input/output (I/O) load-based path management for a plurality of virtual machines (VMs) in a storage area network (SAN), said system comprising:
    a memory area associated with a computing device, said memory area storing a topology description of the SAN, the topology description comprising at least a threshold capacity for the SAN; and
    a processor programmed to:
        perform path management by identifying a plurality of storage paths each from one of a plurality of hosts executing VMs to at least one logical storage device visible therefrom, wherein identifying comprises iteratively performing a max flow algorithm with edge weights increasing with each iteration;
        monitor an I/O load for each of the identified storage paths based on a plurality of links in the identified storage paths;
        identify one or more topology changes on determining that the monitored I/O load represents congestion on at least one of the storage paths; and
        initiate the identified one or more topology changes.

2. The system of claim 1, wherein the processor is further programmed to discover all available devices in the plurality of storage paths during an initial device discovery phase.

3. The system of claim 2, wherein discovering all the available devices further comprises querying switches within the storage paths to obtain a maximum bandwidth capacity of the switches.

4. The system of claim 1, wherein identifying a plurality of storage paths further comprises the processor initially assuming a uniform I/O load per device per host.

5. The system of claim 1, wherein the processor is further programmed to initiate the recommended change to the topology of the SAN by performing at least one of the following without input from an administrator of the SAN: selecting another path from the plurality of storage paths for at least one of the hosts, commanding a storage processor array to re-map the logical storage device to a different controller, migrating data from the logical storage device to another logical storage device, or migrating a datastore from a first host in the plurality of hosts to a second host in the plurality of hosts.

6. The system of claim 1, wherein identifying the one or more topology changes further comprises identifying underutilized storage paths.

7. The system of claim 1, wherein each of the plurality of storage paths comprises a plurality of links, and wherein the memory area further stores link capacities associated with the plurality of links.

8. A method for centralized input/output (I/O) load-based path management for a plurality of virtual machines (VMs) in a storage area network (SAN), said method comprising:
    identifying, by a processor, a plurality of storage paths each from one of a plurality of hosts executing the VMs to at least one logical storage device visible therefrom, wherein identifying comprises iteratively performing a max flow algorithm with edge weights increasing with each iteration;
    monitoring an I/O load for each of the identified storage paths;
    identifying one or more topology changes on determining that the monitored I/O load represents congestion on at least one of the storage paths; and
    initiating, by the processor, the identified one or more topology changes.

9. The method of claim 8, wherein initiating the identified one or more topology changes comprises initiating the topology changes without input from an administrator of the SAN.

10. The method of claim 8, wherein initiating the identified one or more topology changes further comprises selecting another path from the plurality of storage paths for at least one of the hosts and instructing the at least one of the hosts to use the selected, another path.

11. The method of claim 8, wherein initiating the identified one or more topology changes comprises sending a command to a storage processor array managing the logical storage device to re-map the logical storage device to a different controller.

12. The method of claim 8, wherein initiating the identified one or more topology changes comprises at least one of migrating data from the logical storage device to another logical storage device, or migrating a datastore from a first host in the plurality of hosts to a second host in the plurality of hosts.

13. The method of claim 8, wherein identifying the one or more topology changes further comprises determining that the monitored I/O load represents available bandwidth on at least one of the storage paths.

14. The method of claim 8, wherein identifying the plurality of storage paths comprises discovering upper bound capacities of storage devices through testing.

15. The method of claim 8, wherein identifying the one or more topology changes further comprises anticipating changes to the monitored I/O load based on a history of changes in the monitored I/O load of the storage paths.

16. One or more computer-readable storage media including computer-executable instructions that, when executed, cause at least one processor to centralize input/output (I/O) load based topology changes by:
    identifying, by a processor executing in a distributed shared storage system, a plurality of storage paths each from one of a plurality of hosts executing virtual machines (VMs) to at least one logical storage device visible therefrom, wherein identifying comprises iteratively performing a max flow algorithm with edge weights increasing with each iteration;
    monitoring an I/O load for each of the identified storage paths;
    identifying, in response to a change in the monitored I/O load on at least one of the storage paths, one or more topology changes; and
    initiating, by the processor, the identified one or more topology changes.

17. The computer storage media of claim 16, wherein the computer-executable instructions further cause the processor to implement policies to manage path selection, wherein the implemented policies include at least one of round-robin, minimum queue length, balanced path, adaptive path selection, or single active path.

18. The computer storage media of claim 16, wherein the computer-executable instructions further cause the processor to re-identify a plurality of storage paths in response to the addition of a new storage device.

19. The computer storage media of claim 16, wherein the computer-executable instructions monitor the I/O load for each of the identified storage paths by observing trends in the I/O loads.

20. The computer storage media of claim 19, wherein the computer-executable instructions cause the processor to initiate the identified one or more topology changes based on the observed trends.

* * * * *